United States Patent

[11] 3,616,271

| [72] | Inventor | Harry B. Copelin<br>North Graylyn Crest, Del. |
|---|---|---|
| [21] | Appl. No. | 770,480 |
| [22] | Filed | Oct. 25, 1968 |
| [45] | Patented | Oct. 26, 1971 |
| [73] | Assignee | E. I. du Pont de Nemours and Company<br>Wilmington, Del. |

[54] SEPARATION OF CHLOROFORM AND/OR ETHYL ACETATE FROM VINYL ACETATE BY EXTRACTIVE DISTILLATION
8 Claims, 1 Drawing Fig.

| [52] | U.S. Cl. | 203/52, 203/68, 203/69, 203/70, 260/497 A, 260/499, 260/604 AC |
|---|---|---|
| [51] | Int. Cl. | B01d 3/34 |
| [50] | Field of Search | 260/497 A, 499; 203/52, 68, 69, 70 |

[56] References Cited
UNITED STATES PATENTS

| 3,404,177 | 10/1968 | Bala et al. | 260/497 |
|---|---|---|---|
| 3,438,870 | 4/1969 | Roscher et al. | 260/497 |
| 3,458,406 | 7/1969 | Fisher et al. | 260/497 |
| 3,182,006 | 5/1965 | Fruhwirth | 203/68 |

*Primary Examiner*—Lorraine A. Weinberger
*Assistant Examiner*—Vivian Garner
*Attorney*—Amos G. Cole ABSTRACT: An extractive distillation method of separating chloroform, and/or ethyl acetate from vinyl acetate, particularly when such materials are present as impurities in vinyl acetate. The method involves using a hydrocarbon, e.g., an acyclic aliphatic, an alkyl aromatic, or a cycloaliphatic hydrocarbon having a boiling point of at least 100° C., e.g., 100°–250π ζ c., as the extraction solvent.

PATENTED OCT 26 1971
3,616,271
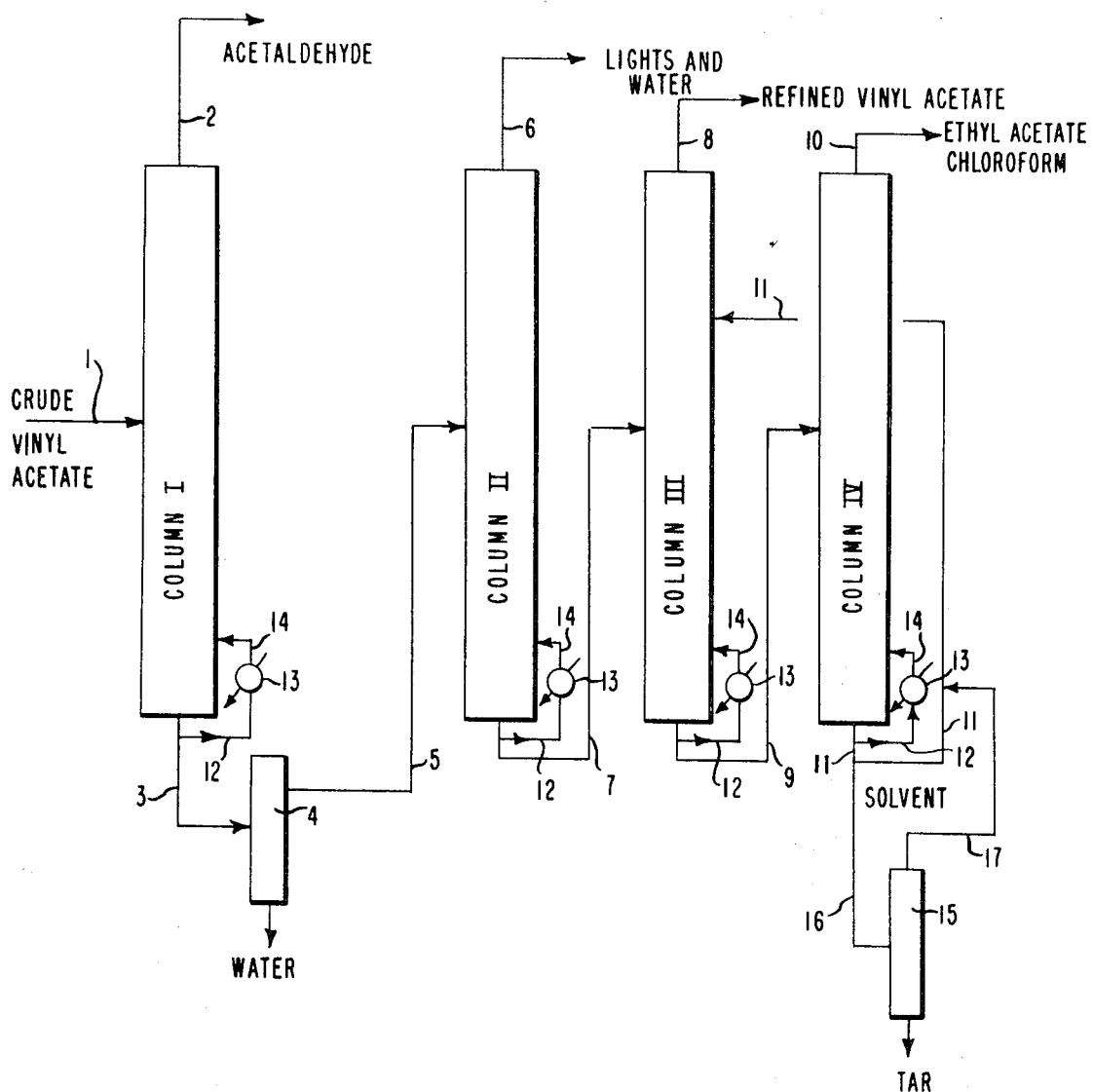
INVENTOR
HARRY B. COPELIN
BY Amos G. Cole
AGENT

SEPARATION OF CHLOROFORM AND/OR ETHYL ACETATE FROM VINYL ACETATE BY EXTRACTIVE DISTILLATION

BACKGROUND OF THE INVENTION

Chloroform and ethyl acetate boil at temperatures sufficiently close to the boiling point of vinyl acetate as to make difficult the separation of either or both from vinyl acetate by simple fractional distillation methods. Their separation by such methods is particularly difficult when the chloroform, and/or ethyl acetate are present at low concentration, e.g., less than 2 weight percent, as impurities in the vinyl acetate.

In recent years, a number of attractive processes have been proposed for the production of vinyl acetate from ethylene. Robinson U.S. Pat. No. 3,190,912 describes one such process which involves the vapor phase reaction of ethylene, acetic acid and oxygen in the presence of a palladium or palladium compound catalyst. British Pat. Nos. 964,001 and 995,551 describe a liquid phase process in which ethylene and oxygen are reacted with an acetic acid solution of a palladium compound catalyst, a metal acetate and a cupric salt oxidizing agent whose function is to maintain the catalyst in its +2 valence state. The oxidizing agent, which becomes reduced during use, is in turn reoxidized by the oxygen, and such reoxidation may be effected in a single stage with oxygen supplied with the ethylene, or in a subsequent stage with oxygen supplied separately from the ethylene. The presence of chloride ions, e.g., supplied as a metal chloride, is considered advantageous; however, McKeon et al. U.S. Pat. No. 3,221,045 describes a process of this type employing an essentially chloride-free system. Holtzrichter et al. U.S. Pat. No. 3,275,680 describes a process using a palladium metal catalyst which is contacted with ethylene, oxygen and acetic acid, preferably in the presence of a metal acetate.

In the above-type processes, various byproducts are obtained along with the vinyl acetate, and when the vinyl acetate is intended for use in polymerization reactions, as is usually the case, it is generally necessary that such by-products, e.g., acetaldehyde and methyl acetate, can be readily separated from the vinyl acetate by chemical or simple fractional distillation methods. Methylethyl ketone and other carbonyl-type impurities can be removed by chemical treatments. However, ethyl acetate and chloroform cannot readily be removed by such methods and their separation from vinyl acetate produced by the above methods has constituted a real problem. Thus, crude vinyl acetate prepared by any of the above methods will generally contain small but objectionable amounts of ethyl acetate as an impurity. Furthermore, if the reaction to produce the vinyl acetate is carried out in the presence of a substantial concentration of chloride ions, the crude vinyl acetate product will usually also contain objectionable amounts of chloroform as an impurity.

The present invention provides a practicable extractive distillation method for separating ethyl acetate and/or chloroform from vinyl acetate.

SUMMARY OF THE INVENTION

A process for separating vinyl acetate and a material which is at least one of the group consisting of chloroform and ethyl acetate from a mixed stream containing vinyl acetate and such material, which process comprises subjecting the mixed stream to at least one extractive distillation using as the extraction solvent a hydrocarbon boiling in the range 100°–250° C.

DRAWING

The accompanying drawing is a diagram in a single FIGURE showing schematically an extractive distillation system for practicing the method of the invention.

DETAILED DESCRIPTION AND PREFERRED EMBODIMENTS

This invention relates to a method of separating a material such as chloroform and/or ethyl acetate from vinyl acetate, particularly when such material is present as an impurity in vinyl acetate. These materials boil at temperatures sufficiently close to the boiling point of vinyl acetate to make their separation from vinyl acetate by simple fractional distillation quite difficult, particularly when a highly purified vinyl acetate is desired. In particular, the invention relates to an extractive distillation method which converts chloroform impurity to a high boiler, thus permitting its separation simultaneously with other high boiling impurities such as ethyl acetate.

Whether or not two liquids can be readily separated from each other by simple fractional distillation will depend upon their relative volatilities under equilibrium distillation conditions. Such relative volatilities are conventionally expressed in terms of the well known "α values" (Perry, Chemical Engineers' Handbook, Third Ed. (1950), page 579). The following α values were determined from equilibrium distillation data using an Othmer still for 1 percent solutions of chloroform ($CHCl_3$) and ethyl acetate (EtOAc) in vinyl acetate (VOAc):

$$\alpha \frac{VOAc}{CHCl_3} = 0.90 \qquad \alpha \frac{VOAc}{EtOAc} = 1.23$$

The above values, which are given in the conventional manner with the more volatile component in the numerator, are too close to unity (at unity, there would be no separation) to permit easy separation by simple fractional distillation. One well-known method for increasing the separability of liquids which are difficult to separate by simple fractional distillation methods is to employ an extractive distillation technique. In accordance with conventional extractive distillation practice, the mixture of liquids to be separated is fed to the central or lower portion of a fractionating column while there is fed to the upper portion of the column an extraction solvent. The solvent must be one which will increase the difference in the volatilities of the liquids to be separated, i.e., will result in a greater α value, so that the more volatile of the liquid or liquids to be separated will be removed as a substantially pure stream from the top of the column while the less volatile of the liquids to be separated together with the extraction solvent will be removed from the bottom of the column. The present invention is based upon the discovery of certain solvents which can be used in extractive distillation methods to improve the separability of chloroform and ethyl acetate from vinyl acetate.

It has been found, in accordance with the invention that chloroform and ethyl acetate can each or both be separated from vinyl acetate by subjecting vinyl acetate containing such materials to extractive distillation using as the extraction solvent a hydrocarbon having a boiling point of at least 100° C., preferably 100°–250° C., most preferably 125°–200° C. Suitable hydrocarbons meeting the above boiling requirement include the straight and branched chain acylic aliphatic hydrocarbons such as pentamethylheptane and paraffinic petroleum hydrocarbon cuts boiling in the above range, kerosene, dipentene, triisobutylene and the like; and the cycloaliphatic hydrocarbons such as trimethyl and diethyl cyclohexane, when the impurity to be separated is ethyl acetate and/or chloroform. These hydrocarbons are also effective in separating chloroform in the absence of ethyl acetate, as are also the alkyl aromatic hydrocarbons such as xylene, triethyl benzene and n-butyl benzene.

Shown below are some α values obtained using Othmer still data for 3:1 weight mixtures of the hydrocarbons shown and crude vinyl acetate containing 1 percent by weight of chloroform or ethyl acetate as impurity. These values show the effects of the hydrocarbons upon the relative volatilities of vinyl acetate and the impurities.

| Solvent | $\alpha \dfrac{\text{VOAc}}{\text{EtOAc}}$ | $\alpha \dfrac{\text{VOAc}}{\text{CHCl}_3}$ |
| --- | --- | --- |
| No solvent | 1.23 | 0.90 |
| Soltrol 1.30* | 1.30 | 1.42 |
| Pentamethylheptane | 1.30 | 1.27 |
| Kerosene | 1.32 | 1.42 |
| Tetralin | — | 1.39 |
| α-Methyl Styrene | 1.37 | 1.23 |
| Cymene | 1.35 | 1.33 |
| Dipentene | 1.32 | 1.39 |
| Mesitylene | — | 1.42 |
| Triisobutylene | 1.27 | 1.45 |
| Pinene | 1.32 | 1.53 |
| Trimethyl Cyclohexane | 1.37 | 1.40 |
| Decalin | 1.27 | 1.59 |
| n-Butyl Benzene | — | 1.30 |
| Cumene | — | 1.25 |
| Triethyl Benzene | — | 1.54 |
| Xylene | — | 1.24 |

*A paraffinic petroleum hydrocarbon cut having a boiling range of about 170°–175° C.

It will be seen from the above tabulation that all of the hydrocarbons shown effectively increase the separability of chloroform. Furthermore, although chloroform normally boils below vinyl acetate, its volatility is so greatly reduced by these hydrocarbon solvents as to permit its removal as a high boiler in the extractive distillation operation of the invention along with any other high boiling impurity, e.g., ethyl acetate, that may also be present. The nonaromatic hydrocarbons also improve the separability of ethyl from vinyl acetate.

An increase in the weight ratio of the extraction solvent: vinyl acetate does, in most instances, result in an increase in the $\alpha$ value and, therefore, in the effectiveness of separation when using such a hydrocarbon as the solvent in extractive distillations. The following data show the effect of increasing the weight ratio of solvent pentamethylheptane:vinyl acetate on the $\alpha$ values:

| Wt. ratio Solvent:VOAc | $\alpha \dfrac{\text{VAc}}{\text{CHCl}_3}$ | $\alpha \dfrac{\text{VAc}}{\text{EtOAc}}$ |
| --- | --- | --- |
| No solvent | 0.90 | 1.23 |
| 1:1 | 1.10 | 1.26 |
| 2:1 | 1.20 | 1.28 |
| 3:1 | 1.27 | 1.30 |
| 4:1 | 1.35 | 1.33 |
| 5:1 | 1.40 | 1.35 |

As indicated previously, the crude vinyl acetate that is obtained from ethylene will generally include one or both of chloroform and ethyl acetate, besides possibly other more readily separated impurities, depending upon the particular process employed in producing the vinyl acetate. Thus, in methods involving the production of vinyl acetate employing a system containing a substantially high concentration of chloride ion, substantial concentrations of both of the above impurities will generally be found in the crude vinyl acetate product. On the other hand, if the production is effected at low chloride concentration or in the substantial absence of chloride ion, little or no chloroform will be present but ethyl acetate generally will be present in the crude product.

It will be seen from the above $\alpha$ values that hydrocarbons having a boiling point of at least 100° C. are effective extraction solvents for use in separating from vinyl acetate either chloroform or ethyl acetate. Thus, when the crude vinyl acetate contains both ethyl acetate and chloroform, they can be separated together as high boilers. Assuming that recovery of the hydrocarbon solvent for reuse is desired, two stills in series would be required. The first still would separate the refined vinyl acetate as overhead product and separate the chloroform and ethyl acetate as a mixture with the hydrocarbon as bottom product. The second still would serve simply to recover for reuse the hydrocarbon from the bottom product of the first still.

The accompanying drawing shows schematically a four-column distillation system which can be used effectively to purify crude vinyl acetate containing chloroform and ethyl acetate in accordance with the invention. If the vinyl acetate to be purified includes significant concentrations of chloroform or ethyl acetate or both, along with substantial amounts of acetaldehyde and light boilers such as methylacetate, all four of the distillation columns shown would normally be employed, assuming that the hydrocarbon used as the extraction solvent is to be recovered and recycled for reuse. AS shown in the drawing, the crude vinyl acetate containing the impurities indicated would be fed via line 1 to column I in the central or lower region thereof. This column would be a simple fractional distillation column from which would be removed acetaldehyde as overhead product via line 2. The bottom stream from the column comprising vinyl acetate and the remaining impurities would be passed via line 3 to a water separator 4 from which any aqueous phase present would be separated and discarded. The organic phase would be passed from separator 4 via line 5 to about the central portion of column II which also is a simple fractionation column from which light boilers and water would be removed as overhead product via line 6. The bottom effluent from column II comprising vinyl acetate and the chloroform and ethyl acetate impurities would be passed via line 7 to about the central portion of column III. Column III is employed as an extractive distillation column. Into the top portion thereof is passed a stream of the extraction hydrocarbon solvent via line 11. The refined vinyl acetate product would be removed as overhead product via line 8 whereas a mixture of the hydrocarbon solvent and the chloroform and ethyl acetate impurities would be removed as bottom product via line 9. Such bottom product would be passed via line 9 to about the middle of column IV, which column would function simply as a fractionating column from which the chloroform and ethyl acetate impurities would be removed as the overhead fraction via line 10 and the hydrocarbon solvent would be removed as the bottom fraction via line 11. Assuming that it will be desirable to reuse the recovered hydrocarbon solvent, the latter would be returned via line 11 to the top of column II. However, instead of feeding recovered hydrocarbon solvent via line 11 to the top of column III, the recovered hydrocarbon can be discarded or used for any desired purpose and fresh hydrocarbon solvent can be fed to the top of column III via line 11. Obviously, if recovery of the solvent for reuse is not desired, the bottom product from column III can simply be discarded, thus obviating the necessity of employing column IV. If, however, recovery and reuse of the hydrocarbon solvent is desired, it may be advantageous to pass the bottom fraction from column IV via line 11 and 16 to a tar separator 15 from which any tar that may have accumulated in the system can be separated and discarded and from which the tar-free recovered hydrocarbon solvent can be recycled via line 17 and 11 to the top of column III.

Each of columns I, II, III and IV of the drawing is shown provided with a reboiler section consisting of line 12 for feeding part of column bottom effluent to a steam-heater boiler 13 and a return line 14. Also, each of the columns shown would be packed column or a plate column of a kind generally employed for effecting fractional distillations, and each would be provided with conventional means (not shown in the drawing) for returning part of the overhead flow as column reflux. If the removal of acetaldehyde and other light boiling impurities is not a problem, columns I and II of the drawing could be omitted and the crude vinyl acetate could then be fed directly via line 7 to column III as indicated.

To illustrate the difficulty of separating chloroform and ethyl acetate from vinyl acetate in which they were present as impurities, a two-still arrangement was employed in which the crude vinyl acetate containing the impurities was fed continuously to the middle of the first still which consisted of a 20-inch upper section and a 36-inch lower section. The lights product was removed from the top of this till while the major portion of the vinyl acetate was removed from the bottom.

The bottom stream from the first still was then passed to the middle of the second still which consisted of a 36-inch upper section and a 12-inch lower section. The product vinyl acetate fraction was taken off as overhead from the second column while the bottom fraction from the second column contained the heavier fractions. The columns of both stills had an inside diameter of one inch and were packed with perforated stainless steel saddles. The conditions under which the two stills were operated were as follows:

Still I—Lights Column

| Reflux Ratio | 20:1 |
|---|---|
| Boilup rate | 68 g./hr. |
| Overhead rate | 34 g./hr. |
| Feed rate | 354 g./hr. |
| Bottoms rate | 320 g./hr. |

Still II—Heavies Column

| Reflux Ratio | 2:1 |
|---|---|
| Boilup rate | 636 g./hr. |
| Feed rate | 320 g./hr. |
| Overhead rate | 212 gm./hr. |
| Bottoms rate | 108 g./hr. |

Such a direct distillation for separating the above impurities from vinyl acetate was quite inefficient as will be evident from the following data showing the impurity contents of the vinyl acetate feed and the vinyl acetate overhead product stream from the second still:

| | %CHCl$_3$ | %EtOAc |
|---|---|---|
| VOAc Feed | 1.08 | 0.63 |
| VOAc Product | 0.90 | 0.23 |

The superior and much easier separation of chloroform and ethyl acetate impurities from vinyl acetate when carried out under extractive distillation conditions employing a hydrocarbon extraction solvent in accordance with the invention is illustrated by the following examples in which all percentage compositions are by weight.

EXAMPLES

In these examples, a single still column packed with perforated stainless steel saddles was employed. It consisted of a 36-inch by 1-inch I.D. bottom section and a 10-inch by 1-inch I.D. top section. The top section included a Corad variable reflux distillation head used to condense the vapors from the top of the column and to control the reflux ratio. The hydrocarbon used as extraction solvent in the three examples was a product of the Phillips Petroleum Company sold under the designation Soltrol 130 which was a paraffinic petroleum hydrocarbon cut having a boiling range of about 170°–175° C. In three extractive distillations, the crude vinyl acetate containing chloroform and ethyl acetate impurities was fed to the still boiler while the hydrocarbon extraction solvent was fed between the two column sections. The refined vinyl acetate product relatively free of the impurities was taken off overhead while the bottom effluent from the column consisted essentially of the hydrocarbon solvent together with the impurities. The conditions under which the three distillations were carried out and the results obtained are shown in the following tabulation.

| Example | 1 | 2 | 3 |
|---|---|---|---|
| Reflux Ratio | 2:1 | 2.5:1 | 5:1 |
| Solvent rate g./hr. | 660 | 660 | 2280 |
| Boilup rate g./hr. | 426 | 300 | 222 |
| Feed rate g./hr. | 324 | 324 | 378 |
| Overhead rate g./hr. | 90 | 90 | 36 |
| Bottom rate (VAc) g./hr. | 234 | 234 | 342 |
| Bottom rate (total) g./hr. | 894 | 894 | 2622 |
| Feed Composition | | | |
| Ethyl Acetate, % | 0.15 | 0.15 | 0.15 |
| Chloroform, % | 0.40 | 0.40 | 0.40 |
| Product Composition | | | |
| Ethyl Acetate, % | 0.011 | <0.01 | <0.01 |
| Chloroform, % | 0.10 | 0.037 | 0.01 |

The above examples show the effective separation of chloroform and ethyl acetate impurities as bottom product in extractive distillations to obtain a relatively chloroform-free and ethyl acetate-free overhead refined vinyl acetate product. The examples thus illustrate the type of extractive distillation operation which would be effected in column III of the drawing. Should the crude vinyl acetate contain acetaldehyde and other light boiling impurities such as methyl acetate whose separation is desirable, their separation could be readily achieved by the use of columns I and II as indicated in the drawing. Also, should it be desired to recover for recycling and reuse the hydrocarbon extraction solvent employed in column III, such recovery for reuse can be readily achieved employing a fractionating column such as column IV as illustrated in the drawing.

I claim:

1. A process for separating vinyl acetate and a material which is at least one of the group consisting of chloroform and ethyl acetate from a mixed stream containing vinyl acetate and said material, which process comprises subjecting said mixed stream to at least one extractive distillation using as the extraction solvent a hydrocarbon having a boiling point of at least 100° C., (a) said hydrocarbon being from the group consisting of acyclic aliphatic and cycloaliphatic hydrocarbons, when said material is ethyl acetate; and (b) said hydrocarbon being from the group consisting of acylic aliphatic, cycloaliphatic and alkyl aromatic hydrocarbons, when said material includes chloroform.

2. The process of claim 1 wherein the hydrocarbon extraction solvent boils at 100°–250° C.

3. The process of claim 1 wherein the hydrocarbon extraction solvent boils at 125°–200° C.

4. The process of claim 1 wherein the hydrocarbon extraction solvent is a paraffinic hydrocarbon cut having a boiling range of about 170°–175° C.

5. The process of claim 1 wherein the hydrocarbon extraction solvent is pentamethylheptane.

6. The process of claim 1 wherein the hydrocarbon extraction solvent is kerosene.

7. The process of claim 1 wherein the hydrocarbon extraction solvent is pinene.

8. The process of claim 1 wherein the hydrocarbon extraction solvent is trimethyl cyclohexane.

* * * * *